US011999047B1

(12) United States Patent
Lin

(10) Patent No.: US 11,999,047 B1
(45) Date of Patent: Jun. 4, 2024

(54) TOOL HOLDING FRAME

(71) Applicant: Shu-Chan Lin, Tainan (TW)

(72) Inventor: Shu-Chan Lin, Tainan (TW)

( * ) Notice: Subject to any disclaimer, the term of this patent is extended or adjusted under 35 U.S.C. 154(b) by 23 days.

(21) Appl. No.: 18/089,935

(22) Filed: Dec. 28, 2022

(51) Int. Cl.
*B25H 3/00* (2006.01)

(52) U.S. Cl.
CPC .................................... *B25H 3/003* (2013.01)

(58) Field of Classification Search
CPC ...................................................... B25H 3/003
USPC ......................... 206/372, 350, 493, 376, 378
See application file for complete search history.

(56) References Cited

U.S. PATENT DOCUMENTS 2,589,349 A * 3/1952 Diefenbach ............ A45C 11/32 211/DIG. 1
4,021,124 A * 5/1977 Sarstedt ................. G01N 21/03 250/576
4,161,830 A * 7/1979 Gentil ....................... G09F 7/04 40/629
4,588,914 A * 5/1986 Heyne .................. H02K 1/2773 310/156.49
4,621,738 A * 11/1986 DeLucchi .............. B25H 3/003 294/158
4,826,021 A * 5/1989 Burrell ................... B25H 3/003 211/89.01
4,927,020 A * 5/1990 Randy ...................... B25H 3/06 206/378
5,228,570 A * 7/1993 Robinson ................ B25B 13/56 81/177.85
5,255,795 A * 10/1993 Kitmitto .................. B25H 1/00 211/DIG. 1
5,398,823 A * 3/1995 Anders .................. B25H 3/003 248/309.2
5,467,874 A * 11/1995 Whitaker ................. B25H 3/06 248/309.2
5,501,342 A * 3/1996 Geibel ................... B25H 3/003 206/378
5,645,177 A * 7/1997 Lin .......................... B25H 3/04 211/69.5
5,669,516 A * 9/1997 Horn ........................ B25H 3/06 211/DIG. 1
5,715,951 A * 2/1998 Dembicks ............... B25B 13/56 206/378
5,725,107 A * 3/1998 Dembicks ................ B25H 3/06 206/378
5,827,487 A * 10/1998 Holmes ..................... A61L 2/26 206/483

(Continued)

*Primary Examiner* — Ernesto A Grano
(74) *Attorney, Agent, or Firm* — BACON & THOMAS, PLLC

(57) ABSTRACT

A tool holding frame has a base and at least one connecting part. The base has a body, a rail, and a magnetic plate. The body has a top, a bottom opposite to the top of the body, an assembling recess formed in the bottom of the body, and multiple positioning pillars protruding inside the assembling recess. The rail is disposed at the top of the body. The magnetic plate is fixed in the assembling recess in an interference fit and has multiple positioning holes respectively disposed on and around the multiple positioning pillars. Each positioning hole is fixed to a corresponding one of the positioning pillars in an interference fit. Each connecting part has a connecting portion and two clamping portions respectively formed at two opposite sides of the connecting portion and respectively engaging with two opposite sides of the rail.

20 Claims, 13 Drawing Sheets

(56) References Cited

U.S. PATENT DOCUMENTS

| | | | | | |
|---|---|---|---|---|---|
| 5,848,694 | A * | 12/1998 | Newton | B25H 3/028 | 206/483 |
| 5,855,285 | A * | 1/1999 | Laird | B25H 3/003 | 206/378 |
| 5,862,913 | A * | 1/1999 | Chou | A47F 5/0823 | 206/378 |
| 5,992,626 | A * | 11/1999 | Anderson | B25G 1/085 | 81/177.4 |
| 6,065,598 | A * | 5/2000 | Anderson | B25G 1/085 | 81/177.4 |
| 6,168,018 | B1 * | 1/2001 | Ramsey | B25H 3/06 | 206/378 |
| 6,386,363 | B1 * | 5/2002 | Huang | B25H 3/003 | 206/378 |
| 6,431,373 | B1 * | 8/2002 | Blick | B25H 3/003 | 206/378 |
| 6,488,151 | B2 * | 12/2002 | Ramsey | B25H 3/06 | 206/378 |
| 6,571,966 | B1 * | 6/2003 | Hsiao | A47F 7/0028 | 206/379 |
| 6,719,155 | B1 * | 4/2004 | Chang | B25H 3/04 | 211/DIG. 1 |
| 6,923,317 | B2 * | 8/2005 | Coleman, Jr. | B25H 3/003 | 206/378 |
| 7,108,132 | B2 * | 9/2006 | Shih | B25H 3/003 | 206/459.1 |
| 7,152,747 | B2 * | 12/2006 | Wang | A47F 5/0006 | 211/70.6 |
| 7,190,248 | B2 * | 3/2007 | Coleman, Jr. | B25H 3/06 | 206/818 |
| 7,621,206 | B2 * | 11/2009 | Makropoulos | B23Q 9/0042 | 83/477.1 |
| 8,336,709 | B1 * | 12/2012 | Geibel | B25H 3/06 | 206/378 |
| 9,205,553 | B2 * | 12/2015 | Ou | B25H 3/04 | |
| 10,716,413 | B2 * | 7/2020 | Winnard | F16B 1/00 | |
| 2003/0233922 | A1 * | 12/2003 | Makropoulos | B23Q 9/0042 | 83/574 |
| 2003/0233925 | A1 * | 12/2003 | Makropoulos | B23D 49/105 | 83/761 |
| 2003/0233926 | A1 * | 12/2003 | Makropoulos | B23D 47/02 | 83/761 |
| 2016/0031074 | A1 * | 2/2016 | Su | B25H 3/003 | 206/349 |
| 2019/0283233 | A1 * | 9/2019 | Kukucka | B25H 3/06 | |

* cited by examiner

TOOL HOLDING FRAME

BACKGROUND OF THE INVENTION

1. Field of the Invention

The present invention relates to a tool holding frame, and more particularly to a tool holding frame being convenient in assembly and having lower manufacturing cost.

2. Description of Related Art

Tool parts applied to power tools or hand tools are juxtaposed on a tool holding frame. Wherein, the tool holding frame has a base and multiple connecting parts disposed on the base. The tool parts can be respectively mounted on the multiple connecting parts for conveniently retrieving the tool parts when an apparatus is being repaired or disassembled.

In order to promote convenience of assembly of the tool holding frame, a conventional tool holding frame has fixing holes for fixing the conventional holding frame to a wall or a bracket. Moreover, the base of the conventional tool holding frame has magnets fixed by rivets. Therefore, the conventional tool holding frame can be magnetically fixed to the bracket with magnetoconductivity. However, fixing the magnets to the base of the conventional tool holding frame via rivets is tedious and has a high manufacturing cost.

In addition, each one of the connecting parts of the conventional tool holding frame has a connecting portion, an abutting buckle, and a spring. The connecting portion has a through hole laterally formed through the connecting portion. The abutting buckle and the spring are mounted inside the connecting portion. The abutting buckle is abutted by the spring and protrudes out from the through hole to abut against the tool part mounted on the connecting part. However, the abovementioned structure of positioning the tool part is inconvenient in assembly and has a high manufacturing cost.

To overcome the shortcomings, the present invention tends to provide a tool holding frame to mitigate or obviate the aforementioned problems.

SUMMARY OF THE INVENTION

The main objective of the invention is to provide a tool holding frame for holding tool parts.

A tool holding frame comprises a base and at least one connecting part. The base has a body, a rail, and a magnetic plate. The body has a top, a bottom opposite to the top of the body, an assembling recess formed in the bottom of the body, and multiple positioning pillars protruding inside the assembling recess. The rail is disposed at the top of the body. The magnetic plate is fixed in the assembling recess in an interference fit and has multiple positioning holes respectively disposed on and around the multiple positioning pillars. Each positioning hole is fixed to a corresponding one of the positioning pillars in an interference fit. Each connecting part has a connecting portion and two clamping portions respectively formed at two opposite sides of the connecting portion and respectively engaging with two opposite sides of the rail.

Other objects, advantages and novel features of the invention will become more apparent from the following detailed description when taken in conjunction with the accompanying drawings.

DETAILED DESCRIPTION OF PREFERRED EMBODIMENT

Figure 1:
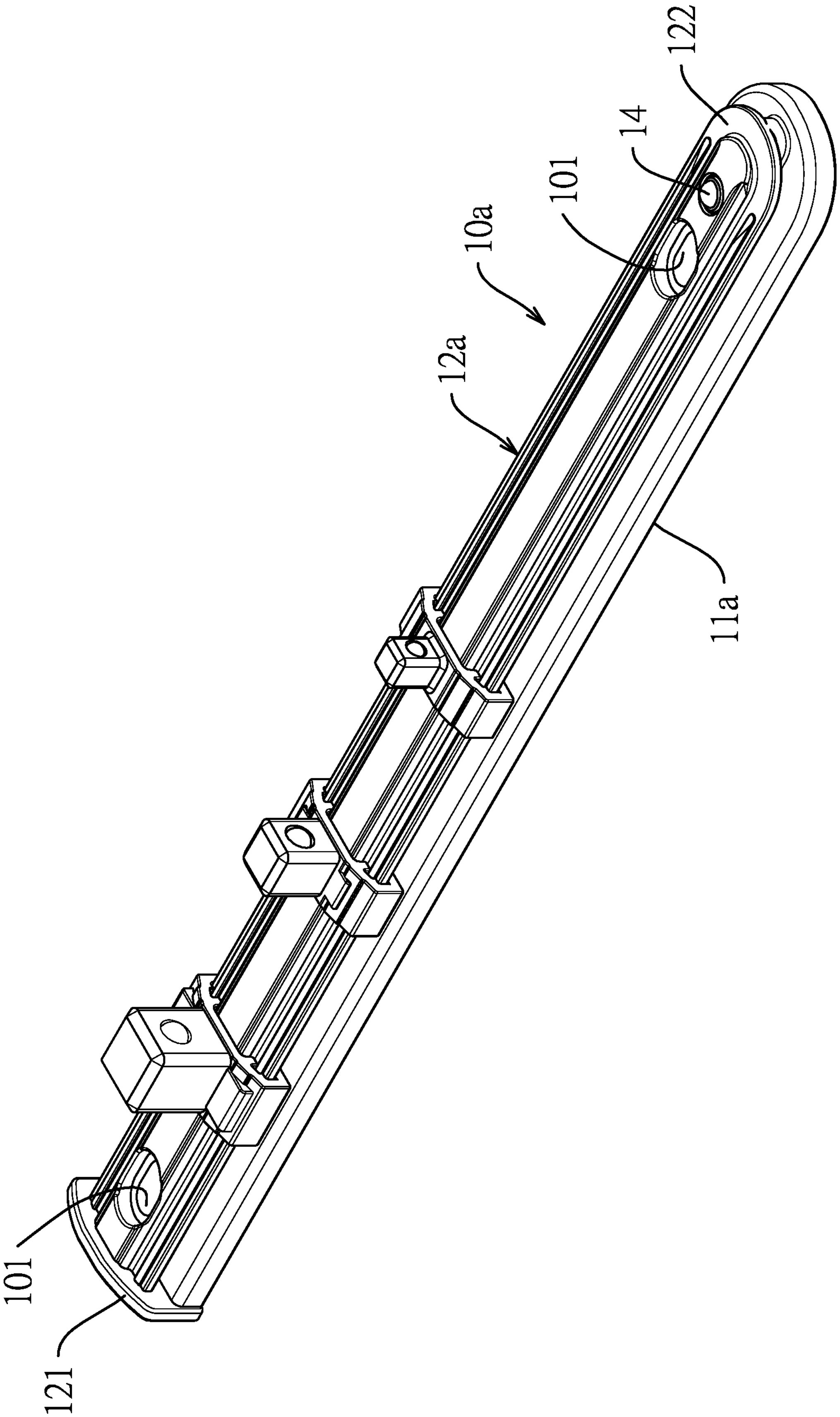
FIG. 1 is a perspective view of a first embodiment of a tool holding frame in accordance with the present invention.

With reference to FIGS. 1 to 13, each one of embodiments of a tool holding frame in accordance with the present invention has a base 10*a*/10*b* and at least one connecting part 20*a*/20*b*.

With reference to FIGS. 1 to 9, the base 10*a*/10*b* has a body 11*a*/11*b*, a rail 12*a*/12*b*, and a magnetic plate 13. The body 11*a*/11*b* has a top, a bottom, an assembling recess 111, and multiple positioning pillars 112. The top and the bottom of the body 11*a*/11*b* are opposite to each other. The assembling recess 111 is formed in the bottom of the body 11*a*/11*b*. The multiple positioning pillars 112 protrude inside the assembling recess 111. The rail 12*a*/12*b* is disposed at the top of the body 11*a*/11*b*. The magnetic plate 13 is shaped as a plate and has multiple positioning holes 131 corresponding to the multiple positioning pillars 112 in position. The magnetic plate 13 is fixed in the assembling recess 111 in an interference fit. Each one of the multiple positioning pillars 112 of the body 11*a*/11*b* is fixed in a corresponding one of the multiple positioning holes 131 in an interference fit. Wherein, each one of the multiple positioning pillars 112 of the body 11*a*/11*b* of the base 10*a*/10*b* has a peripheral surface and multiple pressing protrusions 113 protruding from the peripheral surface of the positioning pillar 112, and the assembling recess 111 has an inner peripheral surface and multiple pressing protrusions 113 protruding from the inner peripheral surface of the assembling recess 111. The multiple pressing protrusions 113 of each one of the multiple positioning pillars 112 abut against an inner peripheral surface of the corresponding one of the multiple positioning holes 131. The multiple pressing protrusions 113 of the assembling recess 111 abut against a peripheral surface of the magnetic plate 13.

Figure 5:
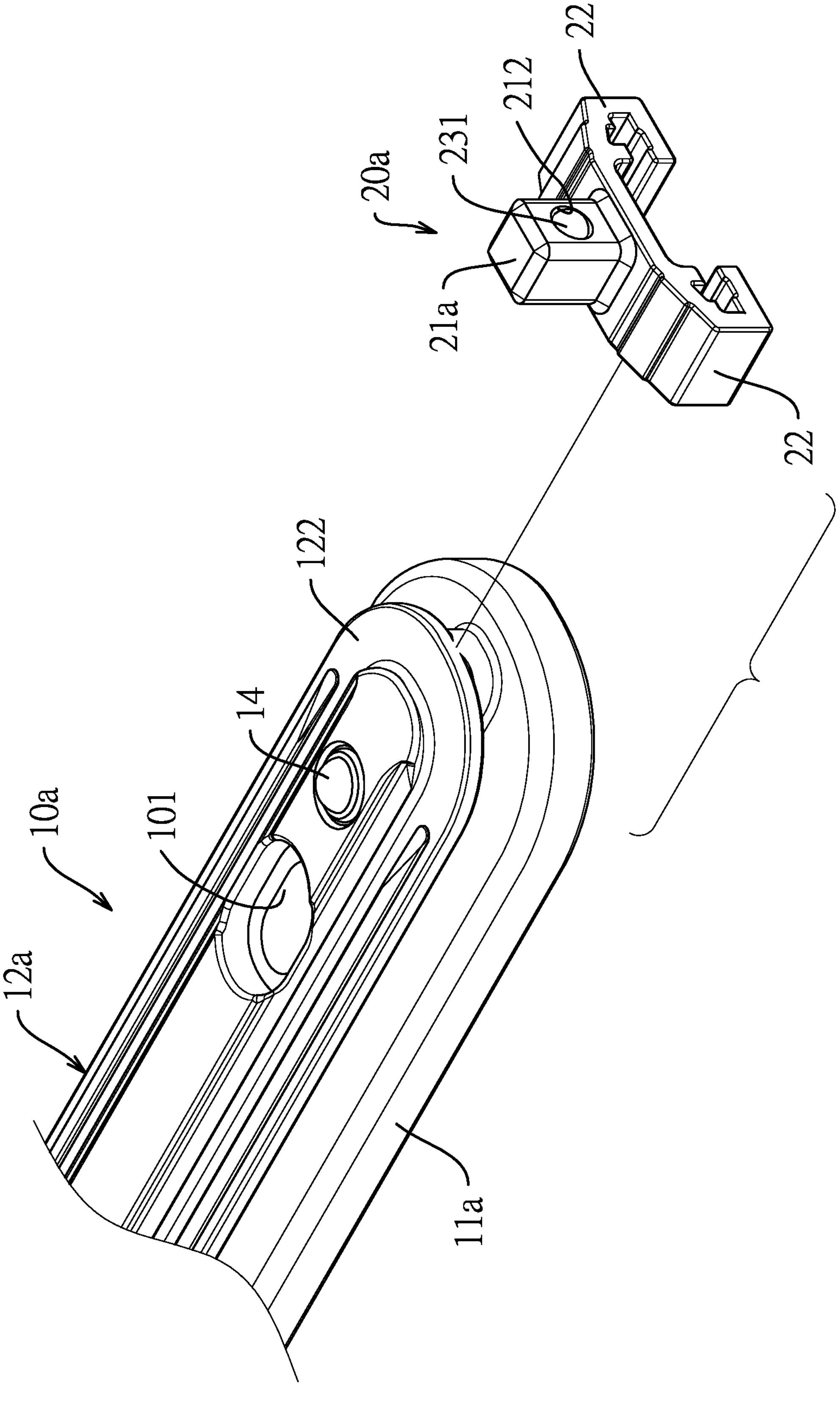
FIG. 5 is a partially exploded perspective view of the tool holding frame in FIG. 1.
Figure 6:
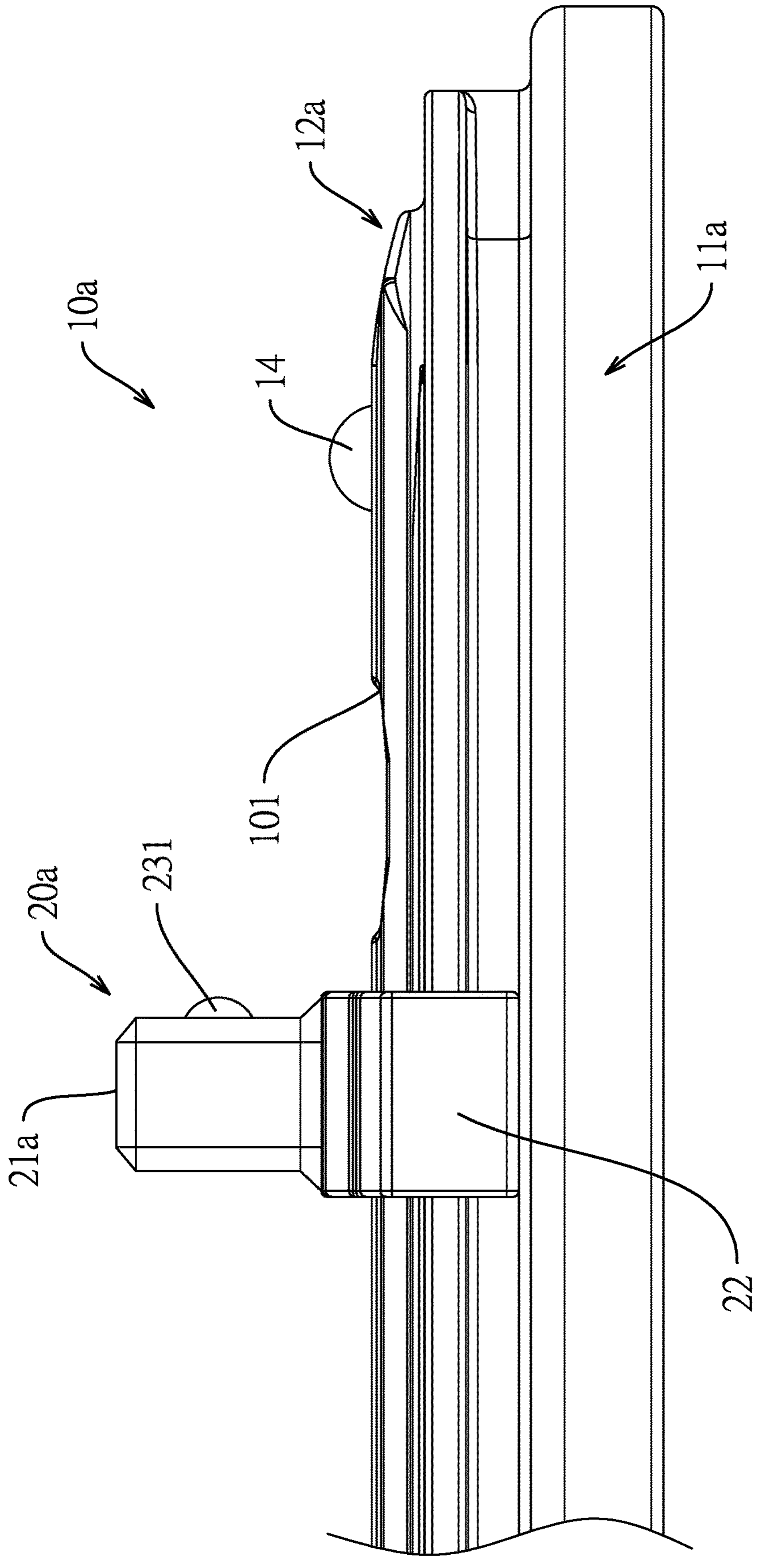
FIG. 6 is an enlarged side view of the tool holding frame in FIG. 1.
Figure 12:
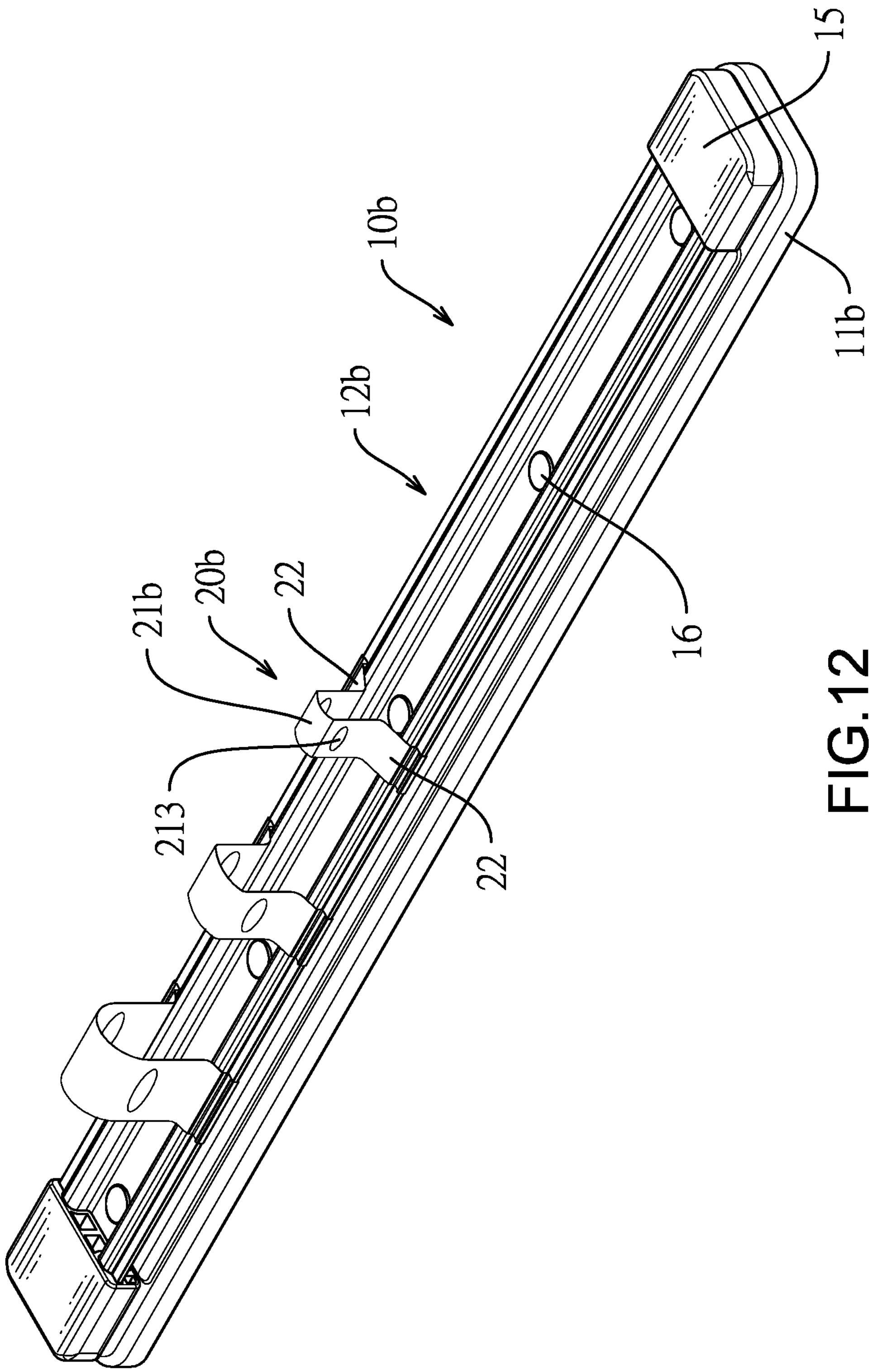
FIG. 12 is a perspective view of connecting parts of a second configuration mounted to the base in FIG. 9.

With reference to FIGS. 1, 5, and 12, each one of the at least one connecting part 20*a*/20*b* is made of a flexible material and has a connecting portion 21*a*/21*b* and two clamping portions 22. The two clamping portions 22 are respectively formed at the two opposite sides of the connecting portion 21*a*/21*b* and configured to respectively engage with two opposite sides of the rail 12*a*/12*b* to facilitate the connecting part 20*a*/20*b* to move along the rail 12*a*/12*b* of the base 10*a*/10*b*.

Figure 3:
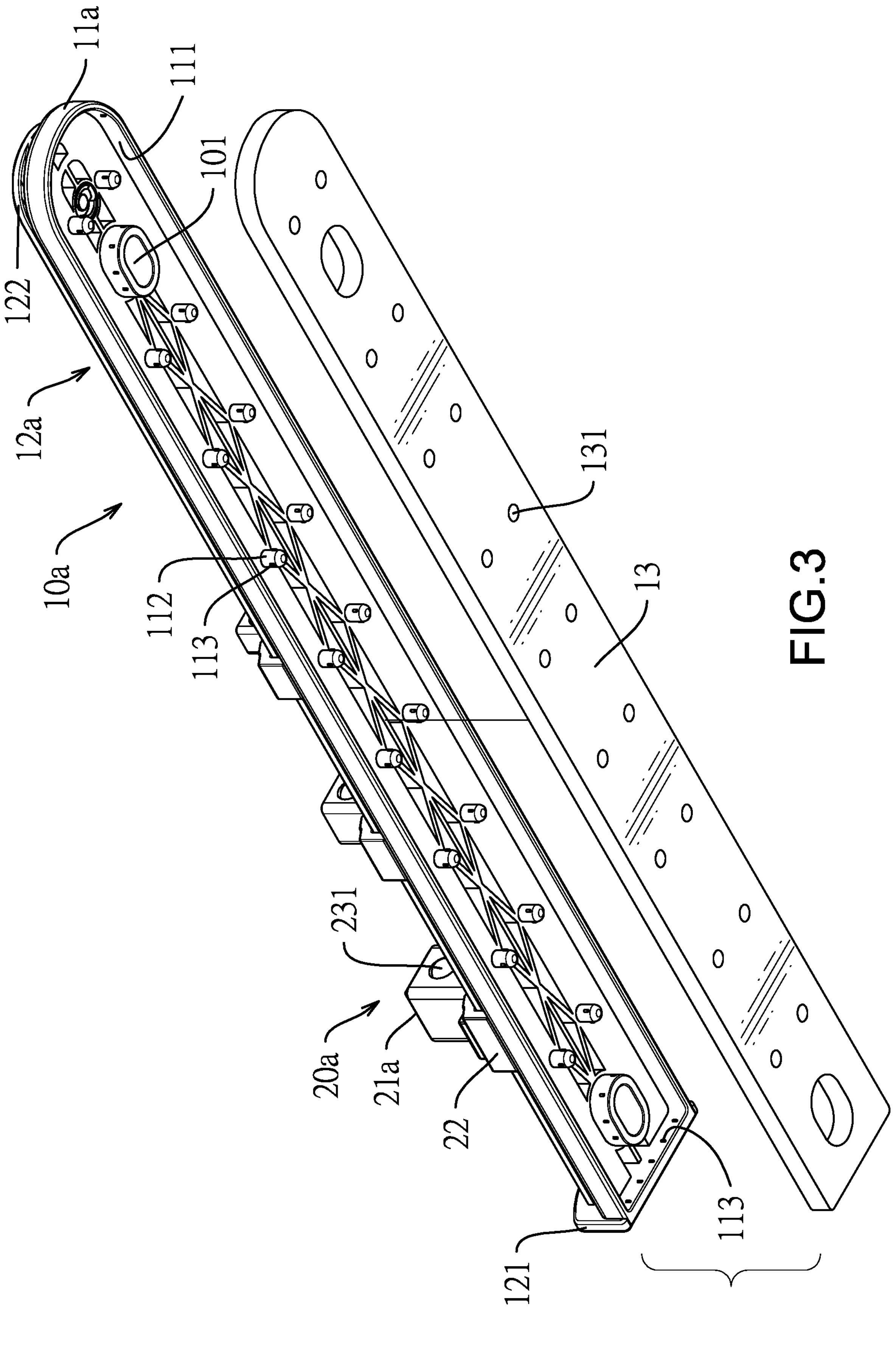
FIG. 3 is an exploded perspective view of a base of the tool holding frame in FIG. 1.
Figure 4:
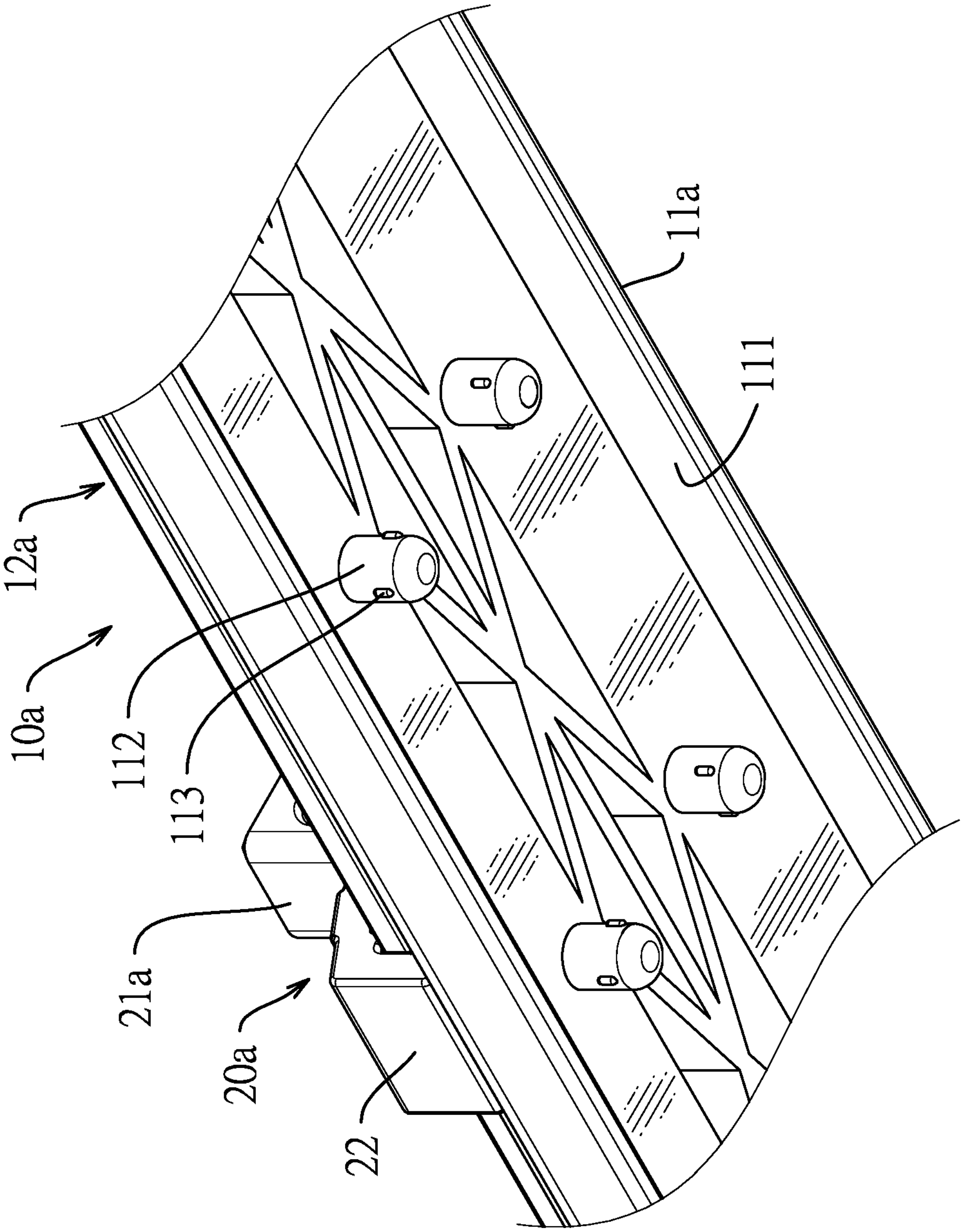
FIG. 4 is a partially enlarged perspective view of the body of the base in FIG. 3.

With reference to FIGS. 3 and 4, the tool holding frame can be magnetically attached to a wall or a bracket with magnetoconductivity (a bracket can be magnetized). Wherein, the magnetic plate 13 is securely fixed to the body 11*a*/11*b* via the magnetic plate 13 fixed in the assembling recess 111 in an interference fit and via each positioning pillar 112 protruding inside the assembling recess 111 fixed in the corresponding one of the multiple positioning holes 131 in an interference fit. In an assembly of the present invention, only the magnetic plate 13 needs to be pressed in the assembling recess 111. Inconvenience of the assembly of the present invention is minimized, and cost of the assembly of the present invention is reduced accordingly.

In addition, with reference to FIGS. 3 and 4, the pressing protrusions 113 formed on the peripheral surface of each positioning pillar 112 and on the inner peripheral surface of the assembling recess 111 enhance a connection between the magnetic plate 13 and the body 11*a*/11*b*.

Wherein, with reference to FIGS. 1 to 9, the base 10*a*/10*b* is designed in various configurations depending on demands.

With reference to FIGS. 1 to 6, in a first embodiment of the tool holding frame in accordance with the present invention, the body 11*a* and the rail 12*a* of the base 10*a* are a unit piece integrally formed together. The base 10*a* has a restricting unit 14. The rail 12*a* has two opposite ends, a blocking portion 121, and a restricting portion 122. The blocking portion 121 and the restricting portion 122 are respectively formed at the two opposite ends of the rail 12*a*. The restricting unit 14 is disposed at the restricting portion 122 of the rail 12*a*. The blocking portion 121 and the restricting unit 14 are configured to restrict the at least one connecting part 20*a*. Moreover, two fixing holes 101 are respectively formed through two opposite ends of the base 10*a*.

Figure 2:
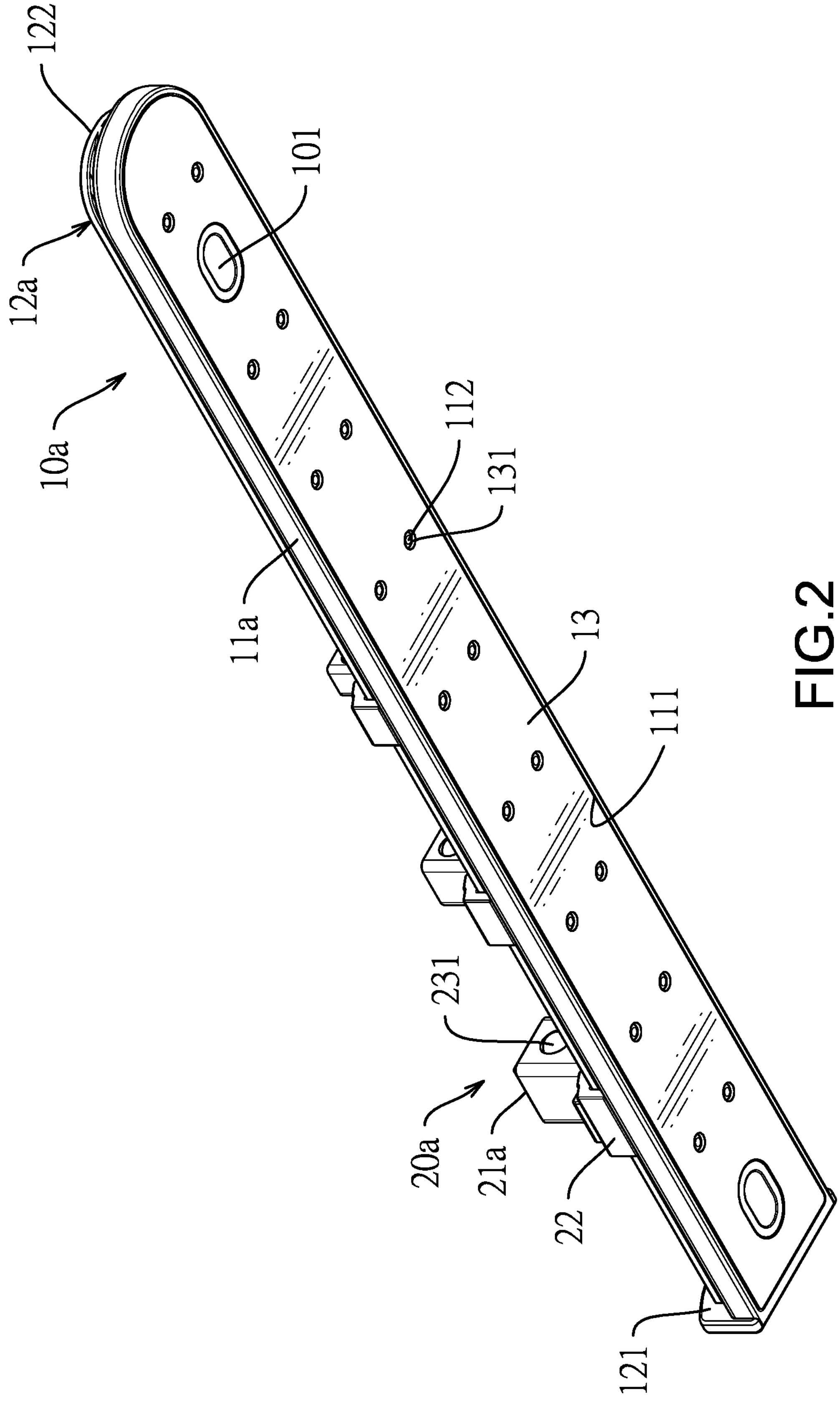
FIG. 2 is another perspective view of the tool holding frame in FIG. 1.

With reference to FIGS. 1 and 2, in the first embodiment of the present invention, the base 10*a* of the tool holding frame in accordance with the present invention can be screwed to or hung on the wall or the bracket. The base 10*a* may be magnetically attached to a device or the bracket with magnetoconductivity via the magnetic plate 13. Wherein, with reference to FIGS. 5 and 6, the at least one connecting part 20*a* is assembled to the rail 12*a* of the base 10*a* from the restricting portion 122, and the two clamping portions of each connecting part 20*a* respectively engage with the two sides of the rail 12*a*. Each connecting part 20*a* being flexible can be pressed to pass through the restricting unit 14 to facilitate the connecting part 20*a* to engage with the rail 12*a*.

With reference to FIGS. 7 to 9, and 12, in a second embodiment of the present invention, the rail 12*b* is connected to the body 11*b* via rivets 16. The base 10*b* has two blocking units 15. The two blocking units 15 are respectively and detachably connected to the two opposite ends of the rail 12*b* for restricting said connecting part 20*a*/20*b*. Moreover, the fixing holes 101 are respectively disposed at the two opposite ends of the body 11*b*.

Figure 7:
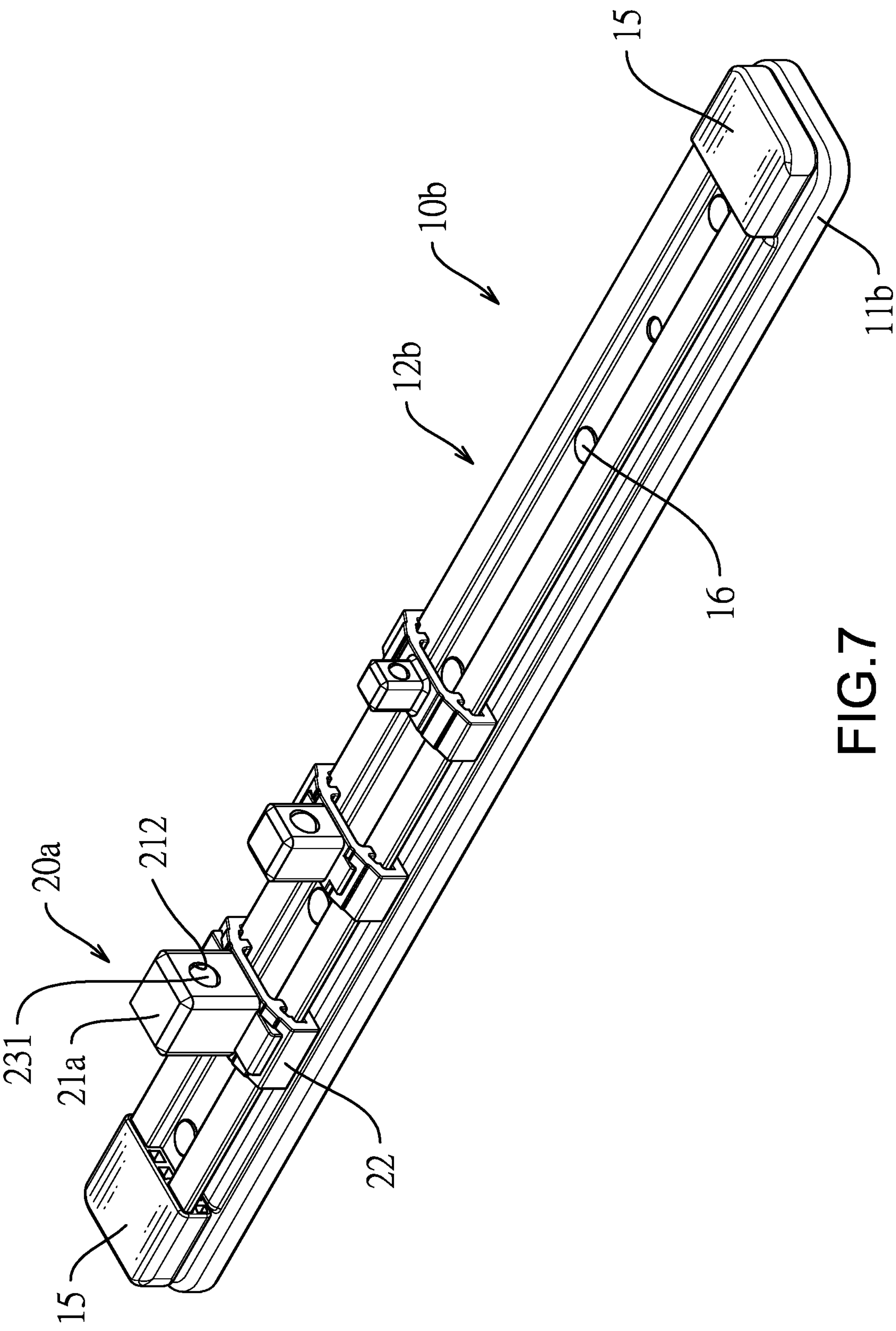
FIG. 7 is a perspective view of a second embodiment of the tool holding frame in accordance with the present invention.
Figure 8:
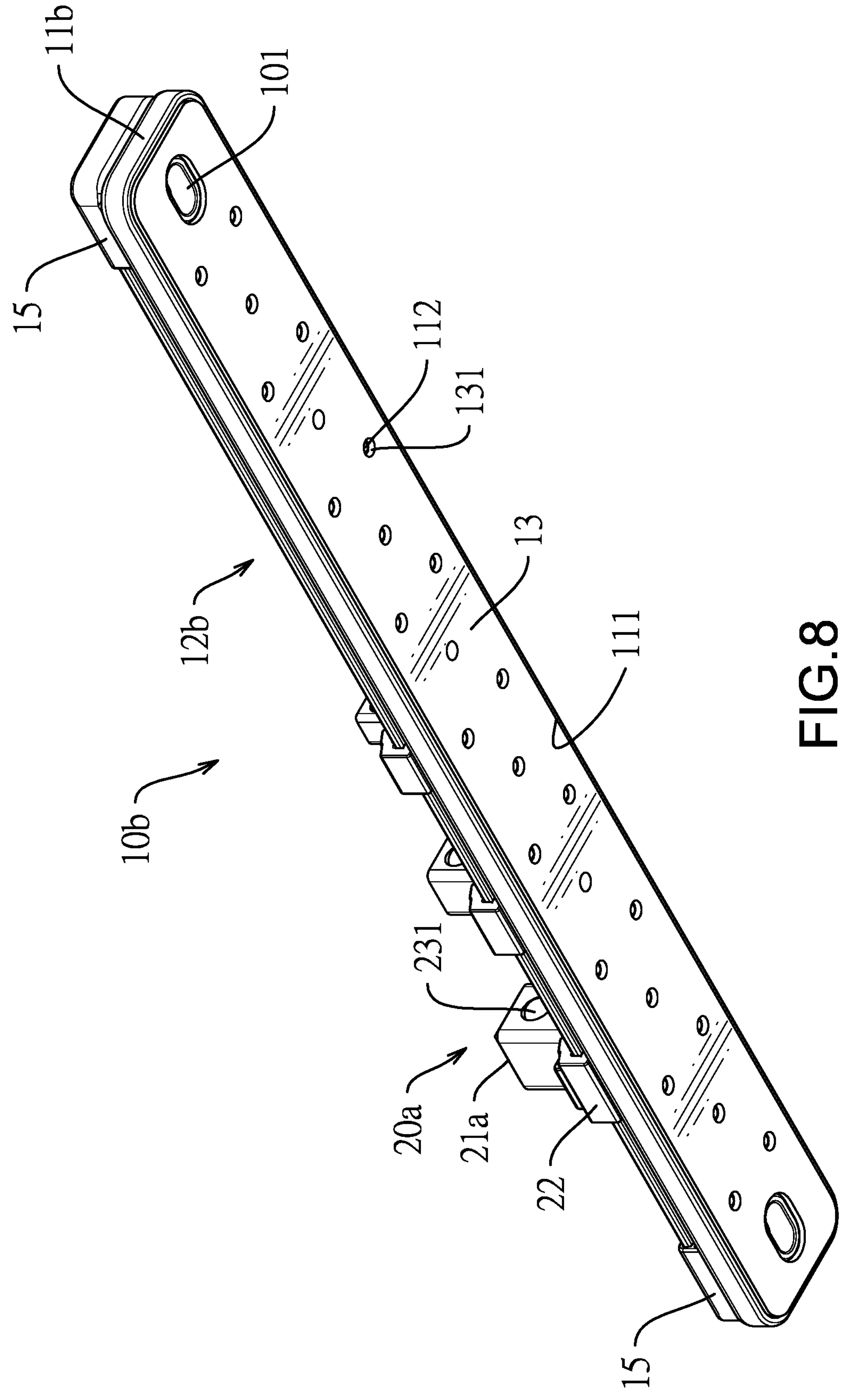
FIG. 8 is another perspective view of the tool holding frame in FIG. 7.
Figure 9:
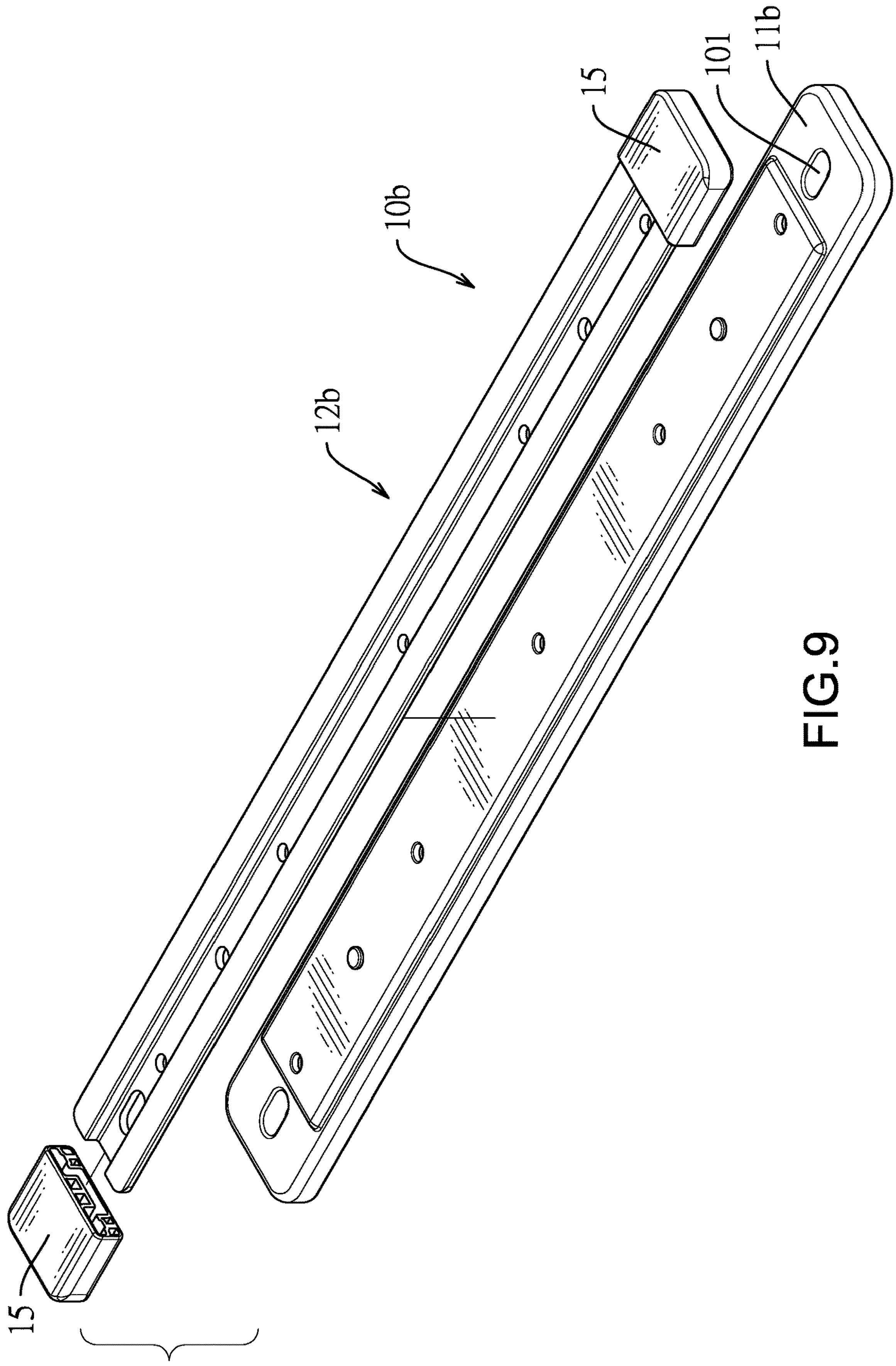
FIG. 9 is an exploded perspective view of a base of the tool holding frame in FIG. 7.

With reference to FIGS. 7 to 9, in the second embodiment of the present invention, the base 10*b* of the tool holding frame in accordance with the present invention can be screwed to or hung on the wall or the bracket. The base 10*b* may be magnetically attached to a device or the bracket with magnetoconductivity via the magnetic plate 13. Wherein, with reference to FIG. 9, before assembling the said connecting part 20*a*/20*b* to the rail 12*b* of the base 10*b*, one of the blocking units 15 is detached from a corresponding one of the two ends of the rail 12*b* at first. Each connecting part 20*a*/20*b* is assembled to the rail 12*b* from the corresponding end of the rail 12*b*, and the two clamping portions 22 of the connecting part 20*a*/20*b* respectively engage with the two sides of the rail 12*b*. Then the detached blocking unit 15 is reinstalled to the corresponding end of the rail 12*b* to complete assembly of each connecting part 20*a*/20*b*.

Figure 10:
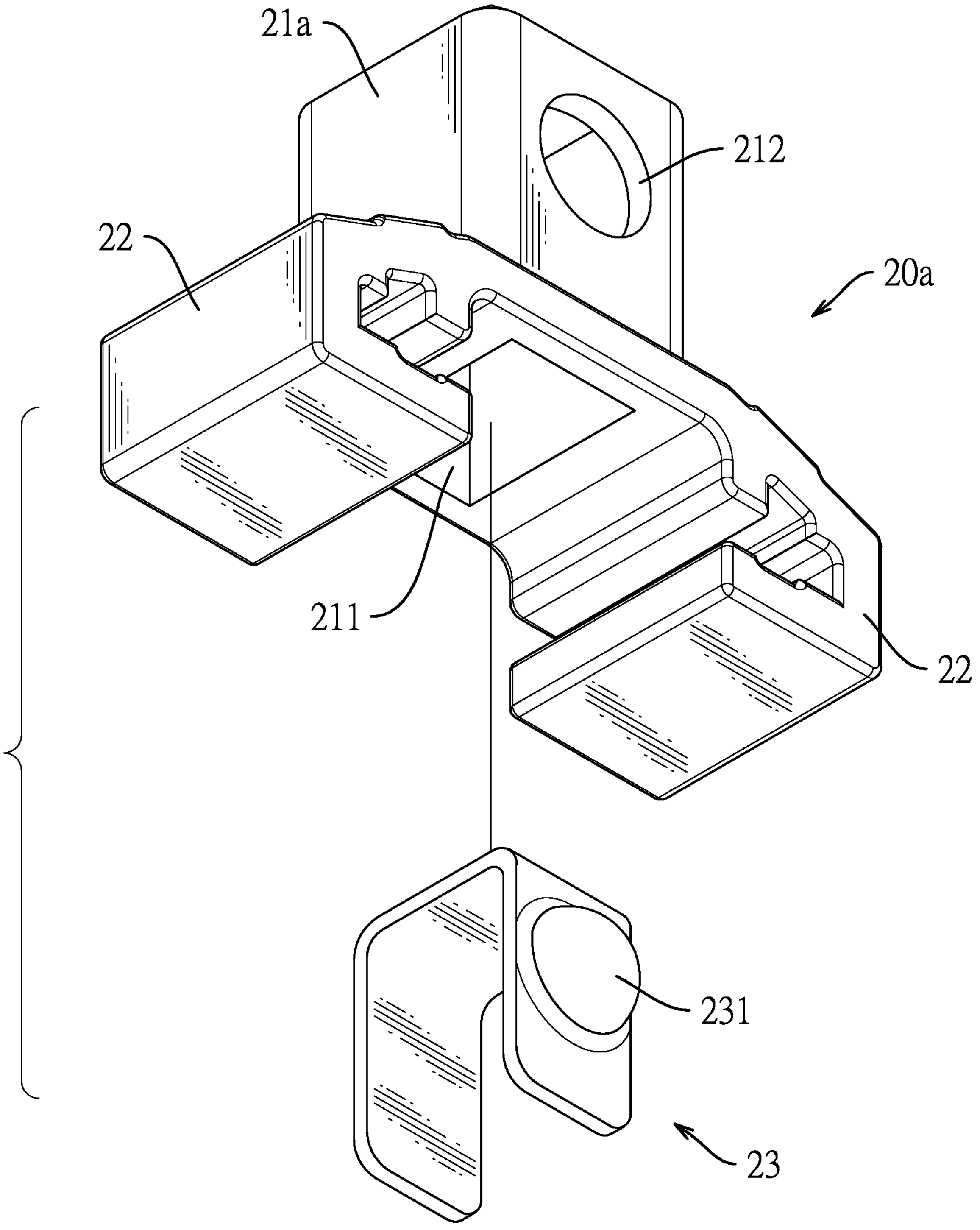
FIG. 10 is an exploded perspective view of a connecting part of a first configuration shown in FIG. 1.
Figure 11:
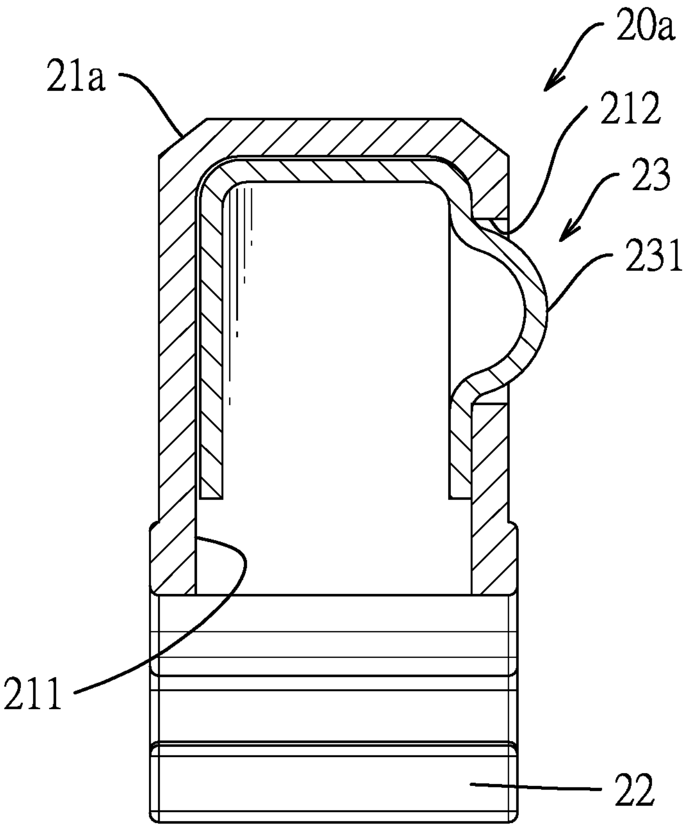
FIG. 11 is a partial cross-sectional side view of the connecting part in FIG. 10.
Figure 13:
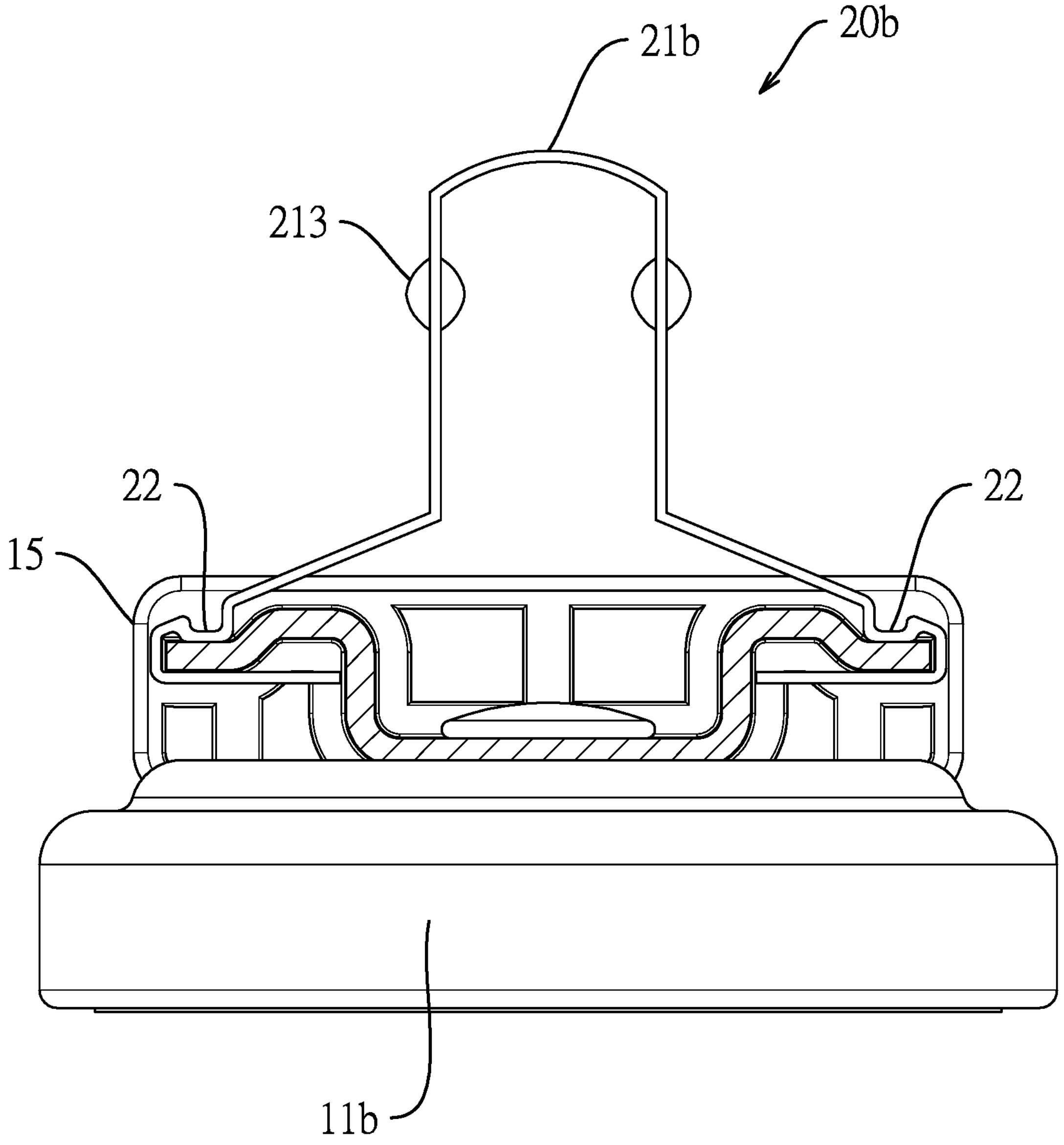
FIG. 13 is a partial cross-sectional side view of the tool holding frame in FIG. 12.

Furthermore, with reference to FIGS. 5, 10, and 13, each connecting part 20*a*/20*b* has two configurations according to a user's need. Wherein, with reference to FIGS. 10 and 11, a connecting part 20*a* of a first configuration has a resilient sheet 23. The resilient sheet 23 is bent and has an abutting protrusion 231. The abutting protrusion 231 protrudes from one of two ends of the resilient sheet 23 and is resiliently moveable. The connecting portion 21*a* of the connecting part 20*a* has an assembling hole 211 and a through hole 212. The assembling hole 211 is disposed at a bottom of the connecting portion 21*a*. The through hole 212 is formed through a side of the connecting portion 21*a* and communicates with the assembling hole 211. The resilient sheet 23 is mounted in the assembling hole 211 of the connecting portion 21*a*. The abutting protrusion 231 protrudes from the through hole 212 of the connecting portion 21*a*. When the connecting part 20*a* is assembled, only the resilient sheet 23 needs to be inserted in the assembling hole 211 to facilitate the abutting protrusion 231 to protrude out of the through hole. The assembly of the connecting part 20*a* is easy and assembly cost of the connecting part 20*a* is reduced.

When a tool part, such as a socket, is deployed on the connecting part 20*a*, the tool part is sleeved, via a drive hole thereof, on the connecting portion 21*a* of the connecting part 20*a*. An inner peripheral surface of the drive hole of the tool part is resiliently abutted against by the abutting protrusion 231 of the resilient sheet 23 of the connecting part 20*a*. Therefore, the tool part is positioned on the connecting part 20*a*.

With reference to FIGS. 12 and 13, a connecting part 20*b* of a second configuration is shown. The connecting part 20*b* is a bent metallic sheet and has at least one abutting bump 213. Each one of the at least one abutting bump 213 protrudes from a side of the connecting portion 21*b* of the connecting part 20*b*. The connecting part 20*b* of the second configuration even further reduces cost of the assembly of the present invention.

When the tool part is deployed on the connecting part 20*b* of the second configuration, the tool part is sleeved, via the drive hole thereof, on the connecting portion 21*b* of the connecting part 20*b*. The inner peripheral surface of the drive hole of the tool part is resiliently abutted against by said abutting bump 213 of the connecting part 20*b*. Therefore, the tool part is positioned on the connecting part 20*b*.

To sum up, in the tool holder of the present invention, the magnetic plate 13 is securely fixed to the body 11*a*/11*b* via each positioning pillar 112 fixed in the corresponding positioning hole 131 in an interference fit and via the magnetic plate 13 fixed in the assembling recess 111 in an interference fit. The assembly only requires pressing the magnetic plate 13 into the assembling recess 111 Manufacturing cost of the present invention is effectively reduced accordingly. In addition, the connecting part 20*a* of the first configuration and the connecting part 20*b* of the second configuration further minimize inconvenience to the assembly of the present invention and reduce the assembly cost of the present invention.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tool holding frame assembly comprising:
a base having
a body having a top, a bottom opposite to the top of the body, an assembling recess formed in the bottom of the body, and multiple positioning pillars protruding inside the assembling recess;
a rail disposed at the top of the body; and
a magnetic plate fixed in the assembling recess in an interference fit and having multiple positioning holes respectively disposed on and around the multiple positioning pillars, each one of the multiple positioning holes fixed to a corresponding one of the multiple positioning pillars in an interference fit; and
at least one connecting part, each one of the at least one connecting part having
a connecting portion having two opposite sides; and
two clamping portions respectively formed at the two opposite sides of the connecting portion and respectively engaging with two opposite sides of the rail to facilitate the connecting part to move along the rail.

2. The tool holding frame as claimed in claim 1, wherein the body and the rail of the base are a unit piece integrally formed together;
the rail has two opposite ends, and a blocking portion and a restricting portion are respectively formed at the two opposite ends of the rail;
the base has a restricting unit disposed at the restricting portion of the rail; and
the blocking portion and the restricting unit are both configured to restrict the at least connecting part.

3. The tool holding frame as claimed in claim 2, wherein two fixing holes are respectively formed through two opposite ends of the base.

4. The tool holding frame as claimed in claim 3, wherein each one of the at least one connecting part has a resilient sheet having
an abutting protrusion protruding from one of two ends of the resilient sheet and being resiliently moveable;
the connecting portion of each one of the at least one connecting part has
an assembling hole disposed at a bottom of the connecting portion; and
a through hole formed through a side of the connecting portion and communicating with the assembling hole; and
the resilient sheet of each one of the at least one connecting part is mounted in the assembling hole of the connecting portion of the connecting part, and the abutting protrusion protrudes from the through hole of the connecting portion.

5. The tool holding frame as claimed in claim 2, wherein each one of the at least one connecting part has a resilient sheet having
an abutting protrusion protruding from one of two ends of the resilient sheet and being resiliently moveable;
the connecting portion of each one of the at least one connecting part has
an assembling hole disposed at a bottom of the connecting portion; and
a through hole formed through a side of the connecting portion and communicating with the assembling hole; and
the resilient sheet of each one of the at least one connecting part is mounted in the assembling hole of the connecting portion of the connecting part, and the abutting protrusion protrudes from the through hole of the connecting portion.

6. The tool holding frame as claimed in claim 5, wherein each one of the multiple positioning pillars has a peripheral surface and multiple pressing protrusions protruding from the peripheral surface of the positioning pillar; and
each one of the multiple positioning holes has an inner peripheral surface abutting against the multiple pressing protrusions of the corresponding one of the multiple positioning pillars;
the assembling recess has an inner peripheral surface and multiple pressing protrusions protruding from the inner peripheral surface of the assembling recess; and
the multiple pressing protrusions of the assembling recess abut against a peripheral surface of the magnetic plate.

7. The tool holding frame as claimed in claim 2, wherein each one of the multiple positioning pillars has a peripheral surface and multiple pressing protrusions protruding from the peripheral surface of the positioning pillar; and
each one of the multiple positioning holes has an inner peripheral surface abutting against the multiple pressing protrusions of the corresponding one of the multiple positioning pillars;
the assembling recess has an inner peripheral surface and multiple pressing protrusions protruding from the inner peripheral surface of the assembling recess; and
the multiple pressing protrusions of the assembling recess abut against a peripheral surface of the magnetic plate.

8. The tool holding frame as claimed in claim 1, wherein the rail is riveted to the body; and
the base has two blocking units detachably connected to two opposite ends of the rail to restrict the at least one connecting part.

9. The tool holding frame as claimed in claim 8, wherein two fixing holes are respectively formed through two opposite ends of the base.

10. The tool holding frame as claimed in claim 9, wherein each one of the at least one connecting part has a resilient sheet having
an abutting protrusion protruding from one of two ends of the resilient sheet and being resiliently moveable;
the connecting portion of each one of the at least one connecting part has
an assembling hole disposed at a bottom of the connecting portion; and
a through hole formed through a side of the connecting portion and communicating with the assembling hole; and
the resilient sheet of each one of the at least one connecting part is mounted in the assembling hole of the connecting portion of the connecting part, and the abutting protrusion protrudes from the through hole of the connecting portion.

11. The tool holding frame as claimed in claim 9, wherein each one of the at least one connecting part is a bent metallic sheet and has at least one abutting bump; and each one of the at least one abutting bump of each one of the at least one connecting part protrudes from a side of the connecting portion of the connecting part.

12. The tool holding frame as claimed in claim 11, wherein each one of the multiple positioning pillars has a peripheral surface and multiple pressing protrusions protruding from the peripheral surface of the positioning pillar; and each one of the multiple positioning holes has an inner peripheral surface abutting against the multiple pressing protrusions of the corresponding one of the multiple positioning pillars;

the assembling recess has an inner peripheral surface and multiple pressing protrusions protruding from the inner peripheral surface of the assembling recess; and the multiple pressing protrusions of the assembling recess abut against a peripheral surface of the magnetic plate.

13. The tool holding frame as claimed in claim 8, wherein each one of the at least one connecting part has a resilient sheet having an abutting protrusion protruding from one of two ends of the resilient sheet and being resiliently moveable;

the connecting portion of each one of the at least one connecting part has an assembling hole disposed at a bottom of the connecting portion; and a through hole formed through a side of the connecting portion and communicating with the assembling hole; and the resilient sheet of each one of the at least one connecting part is mounted in the assembling hole of the connecting portion of the connecting part, and the abutting protrusion protrudes from the through hole of the connecting portion.

14. The tool holding frame as claimed in claim 13, wherein each one of the multiple positioning pillars has a peripheral surface and multiple pressing protrusions protruding from the peripheral surface of the positioning pillar; and each one of the multiple positioning holes has an inner peripheral surface abutting against the multiple pressing protrusions of the corresponding one of the multiple positioning pillars;

the assembling recess has an inner peripheral surface and multiple pressing protrusions protruding from the inner peripheral surface of the assembling recess; and the multiple pressing protrusions of the assembling recess abut against a peripheral surface of the magnetic plate.

15. The tool holding frame as claimed in claim 8, wherein each one of the at least one connecting part is a bent metallic sheet and has at least one abutting bump; and each one of the at least one abutting bump of each one of the at least one connecting part protrudes from a side of the connecting portion of the connecting part.

16. The tool holding frame as claimed in claim 15, wherein each one of the multiple positioning pillars has a peripheral surface and multiple pressing protrusions protruding from the peripheral surface of the positioning pillar; and each one of the multiple positioning holes has an inner peripheral surface abutting against the multiple pressing protrusions of the corresponding one of the multiple positioning pillars;

the assembling recess has an inner peripheral surface and multiple pressing protrusions protruding from the inner peripheral surface of the assembling recess; and the multiple pressing protrusions of the assembling recess abut against a peripheral surface of the magnetic plate.

17. The tool holding frame as claimed in claim 8, wherein each one of the multiple positioning pillars has a peripheral surface and multiple pressing protrusions protruding from the peripheral surface of the positioning pillar; and each one of the multiple positioning holes has an inner peripheral surface abutting against the multiple pressing protrusions of the corresponding one of the multiple positioning pillars;

the assembling recess has an inner peripheral surface and multiple pressing protrusions protruding from the inner peripheral surface of the assembling recess; and the multiple pressing protrusions of the assembling recess abut against a peripheral surface of the magnetic plate.

18. The tool holding frame as claimed in claim 1, wherein each one of the at least one connecting part has a resilient sheet having an abutting protrusion protruding from one of two ends of the resilient sheet and being resiliently moveable;

the connecting portion of each one of the at least one connecting part has an assembling hole disposed at a bottom of the connecting portion; and a through hole formed through a side of the connecting portion and communicating with the assembling hole; and the resilient sheet of each one of the at least one connecting part is mounted in the assembling hole of the connecting portion of the connecting part, and the abutting protrusion protrudes from the through hole of the connecting portion.

19. The tool holding frame as claimed in claim 18, wherein each one of the multiple positioning pillars has a peripheral surface and multiple pressing protrusions protruding from the peripheral surface of the positioning pillar; and each one of the multiple positioning holes has an inner peripheral surface abutting against the multiple pressing protrusions of the corresponding one of the multiple positioning pillars;

the assembling recess has an inner peripheral surface and multiple pressing protrusions protruding from the inner peripheral surface of the assembling recess; and the multiple pressing protrusions of the assembling recess abut against a peripheral surface of the magnetic plate.

20. The tool holding frame as claimed in claim 1, wherein each one of the multiple positioning pillars has a peripheral surface and multiple pressing protrusions protruding from the peripheral surface of the positioning pillar; and each one of the multiple positioning holes has an inner peripheral surface abutting against the multiple pressing protrusions of the corresponding one of the multiple positioning pillars;

the assembling recess has an inner peripheral surface and multiple pressing protrusions protruding from the inner peripheral surface of the assembling recess; and the multiple pressing protrusions of the assembling recess abut against a peripheral surface of the magnetic plate.

* * * * *